United States Patent
Graves et al.

(10) Patent No.: US 7,575,152 B2
(45) Date of Patent: Aug. 18, 2009

(54) TEMPORARY VALUE CARD METHOD AND SYSTEM

(75) Inventors: Phillip C. Graves, Atlanta, GA (US); Dustin Young, Atlanta, GA (US); Phil M. Chakiris, Atlanta, GA (US); Karl Denzer, Atlanta, GA (US)

(73) Assignee: e2Interactive, Inc., Atlanta, GA (US)

( * ) Notice: Subject to any disclaimer, the term of this patent is extended or adjusted under 35 U.S.C. 154(b) by 275 days.

(21) Appl. No.: 11/273,874

(22) Filed: Nov. 15, 2005

(65) Prior Publication Data

US 2007/0108268 A1  May 17, 2007

(51) Int. Cl.
 *G06F 17/00* (2006.01)
 *G06K 15/00* (2006.01)
 *G06K 5/00* (2006.01)
 *G06K 19/00* (2006.01)
 *G06Q 40/00* (2006.01)

(52) U.S. Cl. .................. 235/378; 235/375; 235/380; 235/487; 705/41

(58) Field of Classification Search ........... 235/375, 235/378, 380, 487; 705/40, 53, 64, 77, 21, 705/41

See application file for complete search history.

(56) References Cited

U.S. PATENT DOCUMENTS

| | | | |
|---|---|---|---|
| 5,732,136 A | 3/1998 | Murphree et al. | |
| 5,760,381 A | 6/1998 | Stich et al. | |
| 6,000,608 A | 12/1999 | Dorf | |
| 6,119,946 A | 9/2000 | Teicher | |
| 6,282,522 B1 * | 8/2001 | Davis et al. | 705/41 |
| 6,295,522 B1 * | 9/2001 | Boesch | 705/41 |
| 6,604,679 B2 | 8/2003 | Morooka et al. | |
| 6,793,135 B1 * | 9/2004 | Ryoo | 235/383 |
| 6,805,289 B2 | 10/2004 | Noriega et al. | |
| 7,054,842 B2 | 5/2006 | James et al. | |
| 7,131,578 B2 | 11/2006 | Paschini et al. | |
| 7,437,328 B2 * | 10/2008 | Graves et al. | 705/40 |
| 2001/0001856 A1 | 5/2001 | Gould et al. | |
| 2001/0009005 A1 * | 7/2001 | Godin et al. | 705/37 |
| 2001/0013018 A1 * | 8/2001 | Awano | 705/41 |
| 2001/0042784 A1 | 11/2001 | Fite et al. | |
| 2002/0035479 A1 * | 3/2002 | Takae et al. | 705/1 |
| 2002/0077973 A1 * | 6/2002 | Ronchi et al. | 705/39 |
| 2002/0190123 A1 * | 12/2002 | Anvekar et al. | 235/380 |
| 2003/0001005 A1 * | 1/2003 | Risafi et al. | 235/380 |
| 2003/0027549 A1 * | 2/2003 | Kiel et al. | 455/405 |
| 2003/0028439 A1 * | 2/2003 | Cox et al. | 705/26 |
| 2003/0043985 A1 * | 3/2003 | Wu | 379/144.05 |
| 2003/0069846 A1 | 4/2003 | Marcon | |
| 2003/0126079 A1 * | 7/2003 | Roberson et al. | 705/40 |
| 2003/0154163 A1 | 8/2003 | Phillips et al. | |
| 2003/0200179 A1 * | 10/2003 | Kwan | 705/65 |
| 2003/0205616 A1 * | 11/2003 | Graves et al. | 235/379 |
| 2003/0212796 A1 | 11/2003 | Willard | |
| 2003/0218062 A1 * | 11/2003 | Noriega et al. | 235/380 |
| 2004/0078332 A1 * | 4/2004 | Ferguson et al. | 705/41 |
| 2004/0210449 A1 | 10/2004 | Breck et al. | |
| 2004/0267622 A1 * | 12/2004 | Taylor et al. | 705/26 |

(Continued)

*Primary Examiner*—Daniel Walsh
(74) *Attorney, Agent, or Firm*—Hunton & Williams LLP

(57) ABSTRACT

A method for using a temporary value card is provided. A first value is determined base upon a selection of goods or services from a provider. The temporary value card is sold at a POS. The first value is associated with the temporary value card.

17 Claims, 7 Drawing Sheets

U.S. PATENT DOCUMENTS

| | | | |
|---|---|---|---|
| 2005/0038714 A1* | 2/2005 | Bonet et al. | 705/26 |
| 2005/0125300 A1 | 6/2005 | McGill et al. | |
| 2005/0199705 A1* | 9/2005 | Beck et al. | 235/380 |
| 2005/0216391 A1* | 9/2005 | Tews | 705/37 |
| 2005/0263587 A1* | 12/2005 | Martinez | 235/380 |
| 2006/0037835 A1* | 2/2006 | Doran et al. | 194/302 |
| 2006/0243792 A1* | 11/2006 | Morello et al. | 235/380 |
| 2007/0064262 A1* | 3/2007 | Silverbrook et al. | 358/1.15 |
| 2007/0108268 A1* | 5/2007 | Graves et al. | 235/380 |
| 2007/0187487 A1* | 8/2007 | Wilen | 235/380 |
| 2007/0284439 A1* | 12/2007 | Rosenblatt | 235/380 |
| 2008/0040274 A1* | 2/2008 | Uzo | 705/44 |
| 2008/0109279 A1* | 5/2008 | Csoka | 705/7 |
| 2008/0172331 A1* | 7/2008 | Graves et al. | 705/41 |
| 2009/0138397 A1* | 5/2009 | Sharma | 705/40 |

\* cited by examiner

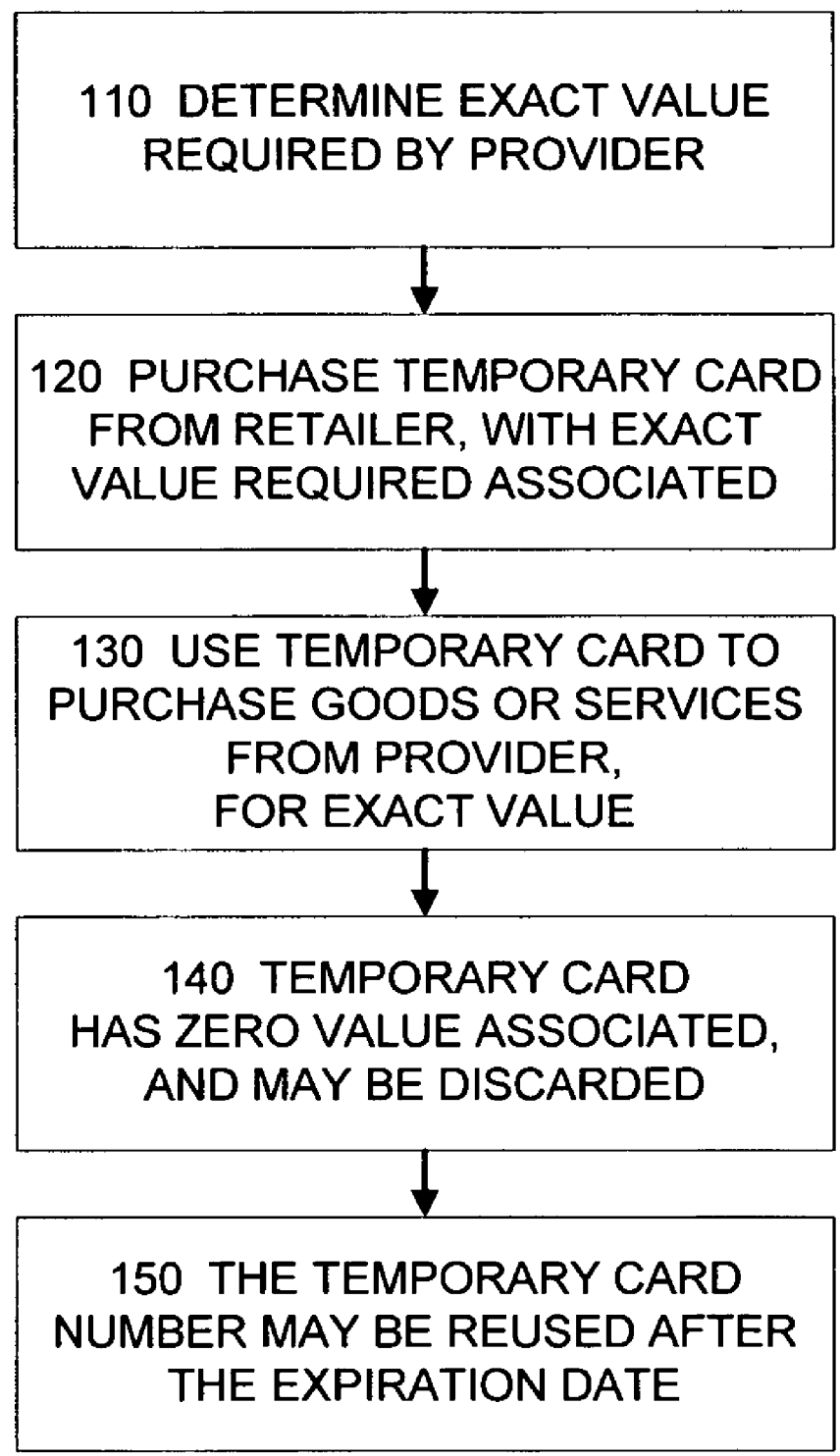

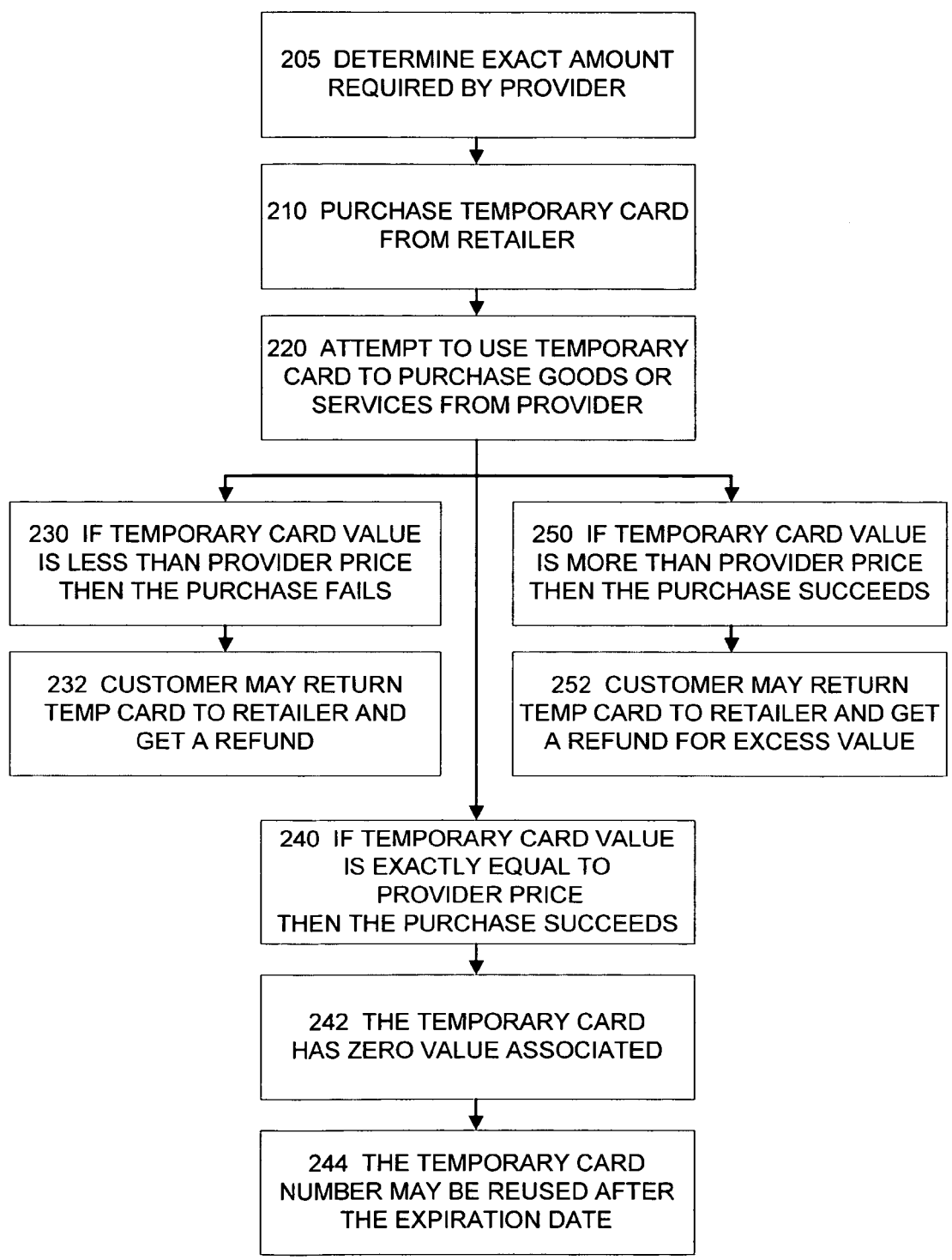

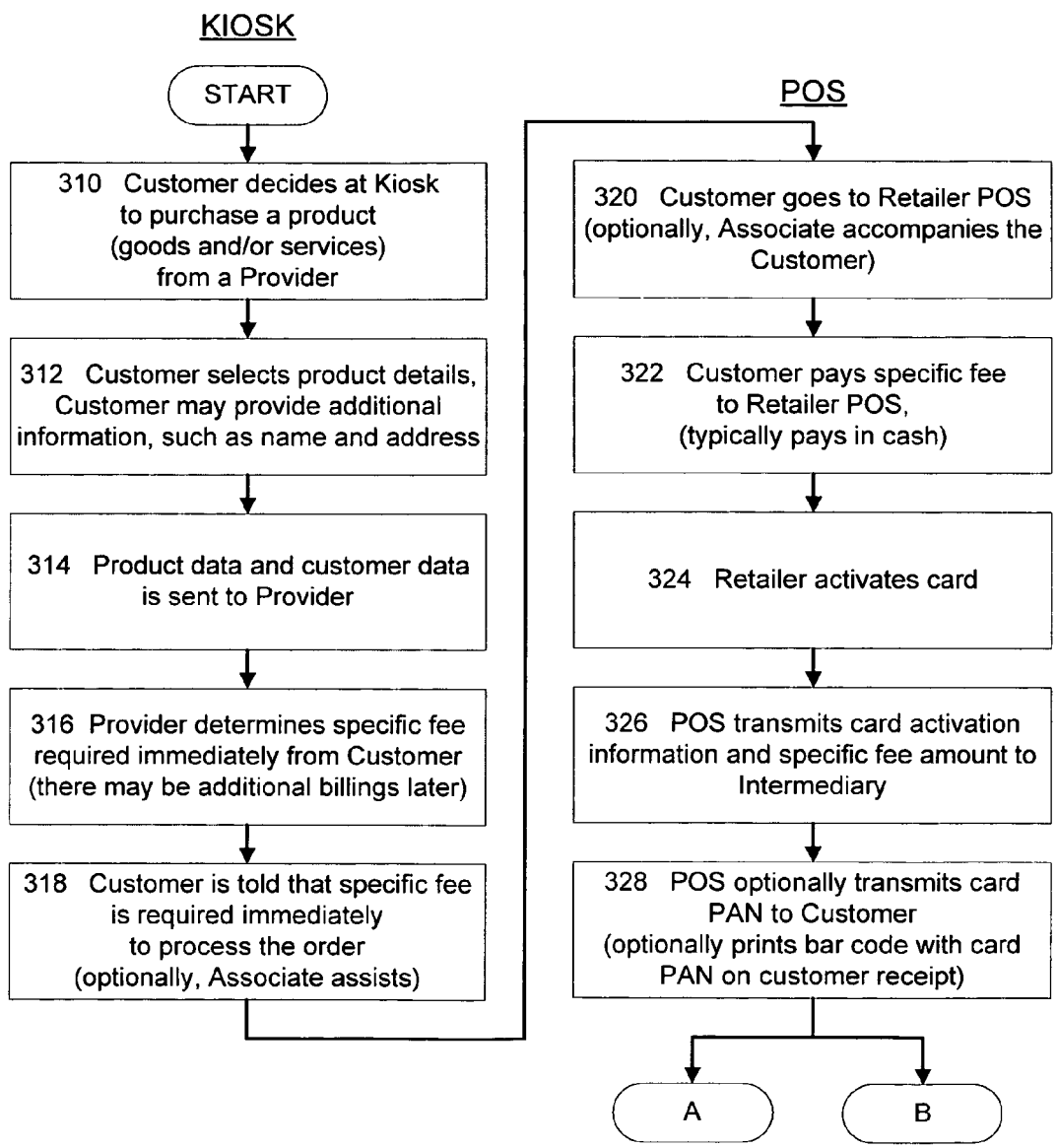

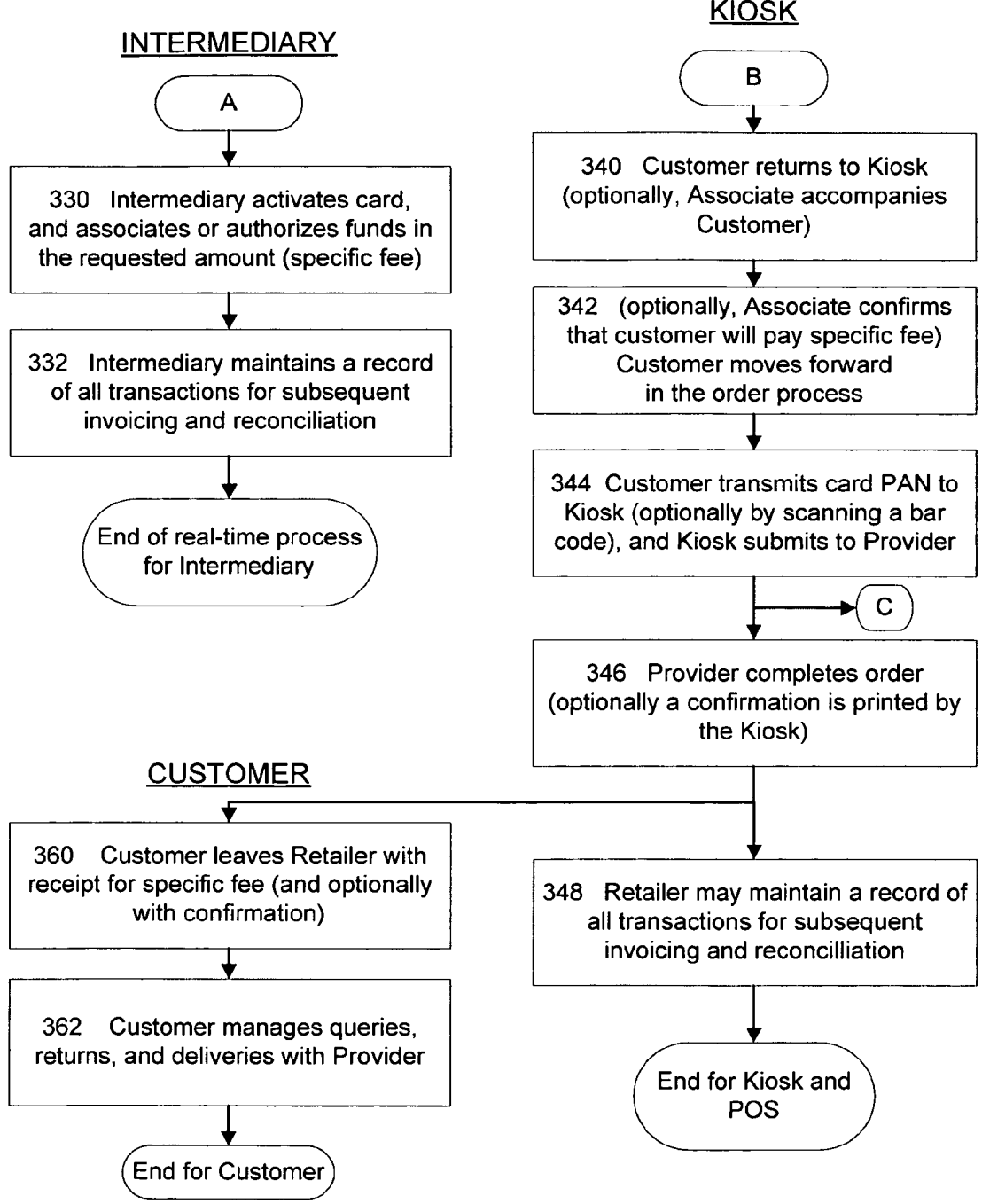

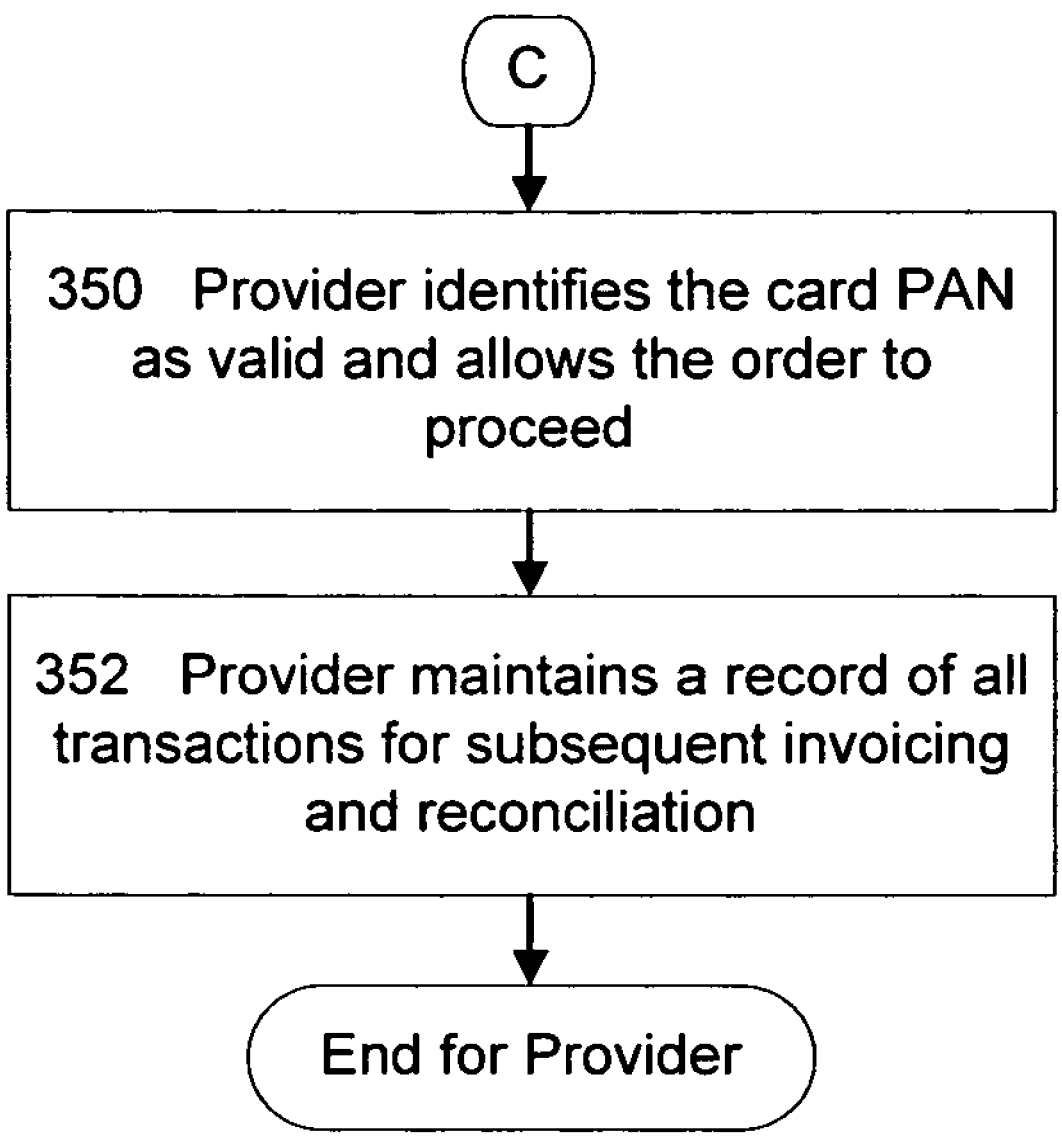

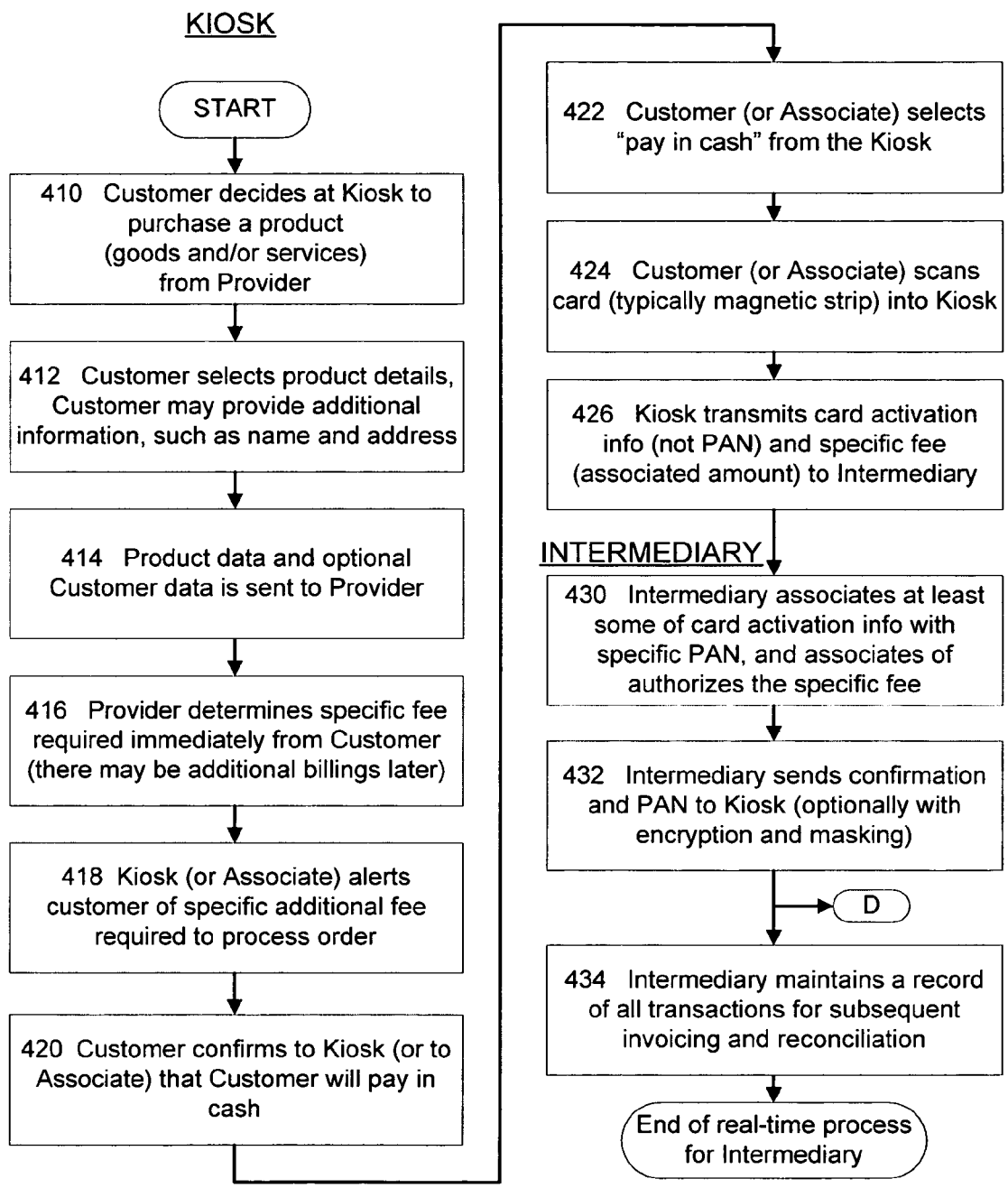

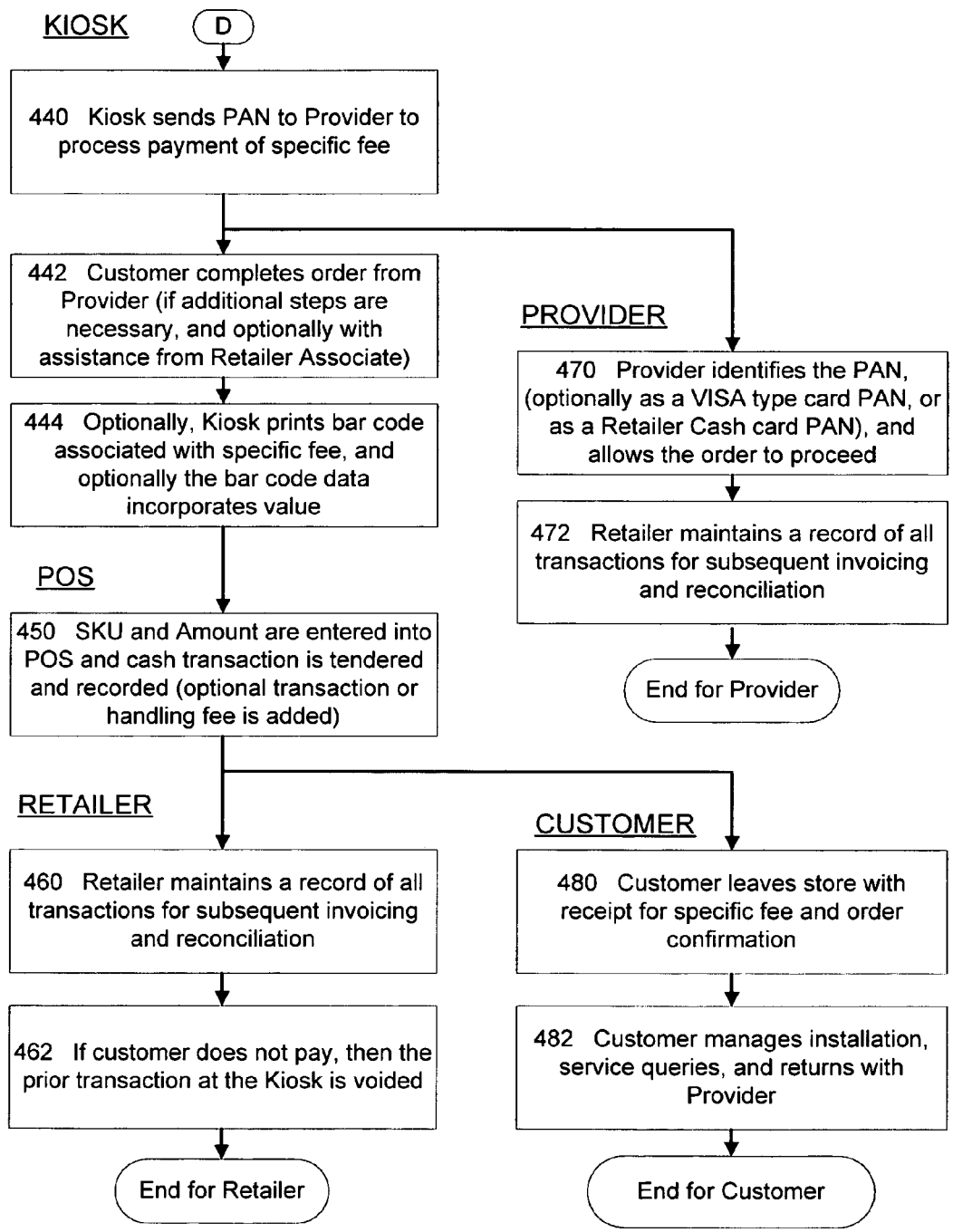

TEMPORARY VALUE CARD METHOD AND SYSTEM

RELATED APPLICATIONS

The following U.S. Patents and U.S. Patent Applications are incorporated by reference: U.S. Pat. Nos. 5,777,305; 6,429,613; and Ser. No. 09/641,363.

FIELD OF THE INVENTION

The present invention relates to the field of credit cards, debit cards, and gift cards.

More particularly, the present invention relates to a temporary card which has some of the beneficial qualities of a credit card, but does not have some of the limiting qualities of a credit card. For example, the temporary card may be quickly purchased with cash (possibly without providing any customer information), and may be used in place of a credit card for purchasing under some circumstances.

BACKGROUND

Credit cards are used for many purposes. For example, credit cards may be used to purchase goods or services without paper cash. A customer may purchase chocolate candy bars using a credit card.

Further, credit cards may be used as a credit screening tool. A provider of goods or services may accept a small deposit (or not require any deposit) from a customer that has a valid credit card. Additionally, a credit card facilitates any purchase that requires future regular billing, such as a monthly cellular telephone service. Further, a provider or merchant may be unwilling to or unable to accept cash for certain transactions. Compared to other forms of payment, paper cash is generally considered risky and expensive due to the potential for theft and the high transaction costs of handling paper cash.

Generally, an automated credit-card transaction begins and ends at an authorization terminal in the store (a POS or point-of-sale). The typical steps for a credit card sale include:
- the merchant reads the account number and expiration date coded on the magnetic strip (this data is generally also embossed on the card),
- the account number and expiration date are associated with a purchase amount,
- the data is transmitted to a merchant's bank,
- the data is forwarded (through a communications network) to whichever bank issued the customer's credit card,
- the card issuing bank calls the appropriate account and checks the contents, particularly the outstanding balance and the card's credit limit (which determine the available credit)
- the card issuing bank may consider additional information to determine whether the transaction should be allowed (to reduce fraud)
- if the request is endorsed (the transaction is allowed), then the card issuing bank notifies the merchant using an approval code, and the card issuing bank promptly stores the new balance in the data base
- finally, the merchant receives the approval code, and the sale is completed.

Alternately, a credit card service (for example, VISA™) may consolidate records from many different banks into one central database, and handle the request as the bank's agent or intermediary for the above transactions.

Further, accelerated and abbreviated procedures may be convenient for small transactions. For example, the merchant or the credit card service may merely compare the account number against a list of valid account numbers. Also, the signature requirement may be waived for small transactions. The commercial advantages of substantially speeding the purchase transaction for small items may outweigh the disadvantages of an increase in the number of small losses.

Debit cards function similarly, except that that the card issuing bank will simply immediately reduce the value of the customer's account by the value of the purchase.

If a purchase transaction occurs online, then generally the CVV (card verification value) from the back of the credit card is required as an added security measure to reduce fraud.

However, credit cards have certain limitations. It takes time and effort to obtain a credit card. Some people (or companies) may be unable to obtain credit cards due to poor credit. Some people may have credit cards, but may wish to avoid using the credit cards in order to avoid high interest rates on any outstanding balance. Some people may have credit cards, but may not have sufficient available credit to make the desired purchase. Some people may have credit cards, but may wish to make a purchase without creating an accounting trail linking the credit card to the purchase (for example, a husband may wish to purchase a surprise gift of jewelry for his wife's birthday). Additionally, obtaining a typical credit card often requires substantial time, effort, and transaction costs.

Thus, there is a need for a temporary card that may be quickly purchased with cash, and may be used in place of a credit card for purchasing under some circumstances. Additionally, there is a need for a system adapted to provide and to process a temporary card.

SUMMARY OF THE INVENTION

In some embodiments, a temporary card may have three elements: a credit card number (or personal account number, also known as PAN), an expiration date (EXP), and a CVV (card verification value). Note that the industry standard credit card number is 16 digits, and passes the "mod lun 10" test, wherein the $16^{th}$ digit is used for verification or authentication. Historically, PANs have from 13 to 19 digits, and the first digit identifies the credit card service (for example, the first digit 4 identifies VISA™). The CVV is used to provide an additional level of security, and generally consists of 3 digits printed on the back of the card. With these three elements (PAN, EXP, and CVV), a purchase may usually be made over the internet. An in-person purchase at a physical store generally requires only two of these three elements (PAN and EXP) to be presented on a physical card (usually presented on a magnetic strip).

The following elements are generally not required on various embodiments of a temporary card, but are generally found on commercial credit cards: magnetic strip, embossed data (generally a credit card number, an expiration date, and the name of the customer), the logo of a major credit card service (typically VISA™ or MASTERCARD™), the name of the specific credit card provider (for example, Bank ABC), signature strip (for the customer's signature), anti-counterfeit security measures such as holograms, and additional printed data.

A card may be an information storage device containing indicia associated with an account, and may comprise a device with: a magnetic strip, optically readable indicia, embossed indicia, and/or electronic circuitry. Also, an account may have an associated value, and may have associated personal information such as a customer name and address. Before activation, a card may have activation information stored (for example, on a magnetic strip). The activation information may comprise: a serial number or identification, a code of typically 5 characters, and other information. Such activation information may be pre-associated with an PAN, or may become associated with a PAN at the time of activation (if the card does not have a PAN printed or embossed at the time of activation).

In some embodiments of the present invention, the card does not have a PAN (printed on the card, or stored on its magnetic strip, or otherwise stored) before activation. After activation, the PAN may be printed on the card, or stored on the magnetic strip, or printed on a receipt.

In some embodiments, a customer may desire to purchase a product or service from a provider, but the provider may not accept cash. The customer may use cash to purchase a temporary card from a retailer, wherein the temporary card has an associated value exactly equivalent to the amount required by the provider. The customer may then use the temporary card to purchase a product or a service from a provider. A temporary card may be tied to a specific provider, or may be generic—i.e., able to be used for multiple providers. After the purchase, the temporary card may have zero value associated with it. For instance, all of the value associated with the card may have been used to purchase the good or service from the provider. In some embodiments, the temporary card can be used to purchase a plurality of goods and services until the card balance has depleted to zero. Once the value has been depleted, the card will be unable to make further purchases and may be discarded.

In some embodiments, if the temporary card does not have sufficient value to perform the purchase, then the temporary card may be returned for a refund. Similarly if the temporary card has excess value remaining after the purchase, then the temporary card may be returned for a refund of the excess value.

In some embodiments, all data transmissions involving payments to a merchant for a particular product or service may be handled at the POS (point of sale) for the corresponding purchase.

In some embodiments, the ordering application (e.g., kiosk) may handle some aspects of payment, which may or may not involve interaction with the POS system. A kiosk may comprise at least one retail stand or booth, including but not limited to the following: a physical booth with at least one live salesperson, a dedicated computer terminal (e.g., similar to an ATM), a general purpose computer terminal, any computer system, or a virtual site on the internet. Further, a kiosk may be located inside of a retail store, or inside of a shopping center, or at a public location such as an airport or park. A kiosk may be adapted to sell a single service or product (for example, film processing), or may be adapted to sell multiple services or products (for example, film processing, cellular phone services, and television program services).

The term "Customer" may refer to one or more persons or entities that purchase (or intend to purchase) a product and/or a service from a kiosk, computer, or other POS.

The term "Associate" (when used as a noun) may refer to a retailer clerk.

The term "product" may refer to one or more goods and/or services purchased from a Provider. The Provider may provide the product directly, or may serve as a middleman for the goods or services.

A customer may purchase a temporary card from a retailer, e.g., at the retailer's POS (point of sale).

In some embodiments, a temporary card may have at least a credit card number (or personal account number or PAN) and an expiration date (EXP).

In some embodiments, a temporary card may have an associated credit card number (or personal account number or PAN) and an expiration date (EXP), as well as a CVV (card verification value).

In some embodiments, a method for using a temporary value card comprises several steps. A first value is determined based upon a selection of goods or services from a provider. For example, a customer may select a set of channels from a cable television provider, and the cable television provider may require an installation fee and the first month to be paid before the installation is scheduled. The temporary value card is sold at a POS. The first value is associated with the temporary value card.

In some embodiments, a method for using a temporary value card comprises other steps. A first value is determined based upon a selection of goods or services from a provider. The temporary value card is sold. The temporary value card is activated. A PAN is transmitted to the provider.

In some embodiments, a method for using a temporary value card comprises different steps. A first value is determined based upon a selection of goods or services from a provider. A temporary value card is activated. A PAN is sent to the provider. Either a tendered payment is received, or else the transaction is voided if the payment is not tendered promptly.

BRIEF DESCRIPTION OF THE DRAWINGS

FIG. 1 shows a flow chart illustrating an exemplary method for purchasing a temporary card according to an embodiment of the invention, wherein the temporary card's initial value equals the exact value required by a provider.

FIG. 2 shows a flow chart illustrating another exemplary method for purchasing a temporary card according to an embodiment of the invention, wherein the temporary card's initial value does not necessarily equal the exact value required by a provider.

FIG. 3A shows a first portion of a process flow chart illustrating an exemplary method for purchasing a temporary card according to an embodiment of the invention, wherein the method involves the transmission of data via a POS device.

FIG. 3B shows a second portion of a process flow chart illustrating an exemplary method for purchasing a temporary card according to an embodiment of the invention, wherein the method involves the transmission of data via a POS device.

FIG. 3C shows a third portion of a process flow chart illustrating an exemplary method for purchasing a temporary card according to an embodiment of the invention, wherein the method involves the transmission of data via a POS device.

FIG. 4A shows a first portion of a process flow chart illustrating an exemplary method for purchasing a temporary card according to an embodiment of the invention, wherein the method involves the transmission of data via a kiosk.

FIG. 4B shows a second portion of a process flow chart illustrating an exemplary method for purchasing a temporary card according to an embodiment of the invention, wherein the method involves the transmission of data via a kiosk.

DETAILED DESCRIPTION OF EXEMPLARY EMBODIMENTS

FIG. 1 is a flow chart 100 showing one embodiment for purchasing a temporary card having an initial value equal to an exact value required by a provider.

In block 110, the exact value required by a provider to purchase a good or service may be determined. For example, a customer may desire to purchase television service or telephone service at a kiosk from a provider. The kiosk may not accept cash, or the customer may not have a credit card. Additionally, the provider may request (or require) some deposit immediately, or may request payment in full for a particular good or service immediately.

In block 120, the customer may purchase a temporary card from a retailer, and the exact value required by the provider is associated with the temporary card. The retailer may charge a transaction fee in addition to the exact value required by the provider. At block 130, the customer uses the temporary card to purchase goods or services from the provider for the exact value of the temporary card. At block 140, the temporary card has had the associated value reduced to zero due to the purchase, and may be discarded. At block 150, the temporary card number (PAN) may be reused, e.g., after the expiration date passes.

FIG. 2 is a flow chart showing one embodiment for purchasing a temporary card, and illustrating what happens when the value of the temporary card does not equal the exact value required by a provider. In flow chart 200, at block 210, a customer may purchase a temporary card from a retailer. At block 220, the customer attempts to use the temporary card to purchase goods or services from a provider. There are at least three possible branches from block 220.

First, at block 230, if the temporary card has an associated value which is less than the exact value required by the retailer (the provider price), then the purchase may fail due to lack of associated value. At the following block 232, the customer may return the temporary card to the retailer and get a refund, or else add value and make another attempt to purchase.

Second, at block 240, if the associated value of the temporary card is exactly equal to the exact value required by the retailer (the provider price), then the purchase may succeed. During or approximately during the purchase, the value associated with the temporary card may be reduced to zero ("zeroed"). At block 242, the temporary card may be destroyed, and the temporary card number may be recycled. In some embodiments, the card number may be recycled only after the expiration date.

Third, at block 250, if the associated value of the temporary card is greater than the exact value required by the provider (the provider price), then the purchase may succeed. During or approximately during the purchase, the value associated with the temporary card may be reduced by the provider price, and the remainder of the value may stay associated with the temporary card. At block 252, the customer may return the temporary card to the retailer. The customer may get a refund equivalent to the excess value that remained associated with the temporary card.

FIGS. 3A-3C show a detailed process flow chart of one embodiment for purchasing a temporary card, wherein the data is transmitted by POS.

As shown in FIG. 3A, blocks 310-318 may occur at a Kiosk. At block 310, a Customer may decide to purchase a product (goods and/or services) from a Provider. At block 312, the Customer may select product details. The customer may also provide additional information such as name and address.

At block 314, product data and customer data may be sent to the Provider.

At block 316, the Provider determines a specific fee required immediately from the Customer before completing the sale. The Provider may consider additional information from other sources (such as a credit rating of the Customer), and the Provider may require additional payments later. At block 318, the Customer is told that the specific fee is required immediately to process the order. Optionally, an Associate (for example, a retailer clerk) may assist during this transaction.

Blocks 320-328 may occur at a POS (point of sale) of the Retailer, or at another location. At block 320, the Customer may go to a retailer POS. Optionally, the Associate may accompany the Customer to the POS. Note that the Kiosk and the POS may merely be separate programs or screens at the same computer, and thus "go to a retailer POS" may mean merely calling up a screen or menu to perform the payment transaction. In other words, the Kiosk and the POS may be the same physical unit, although functionally they are different entities (for example, different subprograms).

At block 322, the Customer pays the specific fee to the POS. Payment may be in cash. The retailer may charge a transaction or handling fee, in addition to and separate from the specific fee. The retailer may provide and activate a temporary card.

At block 326, the POS may transmit card activation information and the specific fee amount to an Intermediary, or directly to the Provider.

At block 328, the POS may transmit the card PAN to the Customer, and may optionally print a bar code (or other automatically readable indicia associated with the card PAN) on the Customer receipt. Optionally, the card PAN or readable indicia may be stored on the card magnetic strip, or otherwise stored on the card.

As shown in FIG. 3B, blocks 330 and 332 may occur at an Intermediary. At block 330, an Intermediary activates the card and associates or authorizes funds in the requested specific fee amount. Authorizing funds may comprise associating funds with an account PAN.

At block 332, the Intermediary maintains a record of all transactions for subsequent invoicing and reconciliation. Note that the Intermediary may receive transactional payments separately from the Retailer or from the Provider for facilitating the transactions.

Blocks 340-348 may occur at the Kiosk. At block 340, the Customer returns to the Kiosk. Note that "returning" to the Kiosk may mean merely accessing another screen or program. Optionally, the Associate accompanies the Customer back to the Kiosk.

At block 342, the Customer moves forward in the order process. Optionally, the Associate confirms that the Customer will pay the specific fee.

At block 344, the Customer transmits the card PAN to the Kiosk (optionally by scanning a bar code, or similar indicia), and the Kiosk submits the card PAN to the Provider.

At block 346, the order is completed. Optionally, a confirmation is printed by the Kiosk.

At block 348, the Retailer may maintain a record of all transactions for subsequent invoicing and reconciliation.

Blocks 360 and 362 relate to actions that occur involving the Customer after the sale. At block 360, the Customer leaves the Retailer with a receipt for the specific fee and optionally with an order confirmation.

At block 362, the Customer may manage queries, returns, and deliveries with the Provider.

In FIG. 3C, blocks 350 and 352 relate to the Provider. At block 350, the Provider identifies the card PAN as valid and allows the order to proceed.

At block 352, the Provider may maintain a record of all transactions for subsequent invoicing and reconciliation.

FIGS. 4A and 4B show a detailed process flow chart of one embodiment for purchasing a temporary card, wherein the data is transmitted by a Kiosk.

As shown in FIG. 4A, blocks 410-426 may occur at a Kiosk. At block 410, a Customer at a Kiosk decides to purchase a product (goods and/or services) from a Provider.

At block 412, the Customer may select product details. The Customer may also provide additional information such as name and address.

At block 414, the product data and Customer data are sent to the Provider.

At block 416, the Provider determines the specific fee required immediately (before the Provider accepts the order) from the Customer. There may also be additional billings later. For example, there may an immediate delivery or installation fee, followed by monthly service fees.

At block 418, the Kiosk (or an Associate) may alert the Customer of the specific fee required to process the order.

At block 420, the Customer confirms to the Kiosk (or to the Associate) that the Customer will pay in cash.

At block 422, the Associate selects "pay in cash" from the Kiosk. At block 424, the Associate scans the card (typically a magnetic strip) into the Kiosk.

At block 426, the Kiosk transmits the card activation information (not the PAN) and the specific fee to an Intermediary.

Blocks 430 to 434 may occur at the Intermediary. At block 430, the Intermediary associates at least some of the card activation information with a PAN, and associates or authorizes the specific fee or requested amount. The card activation information may comprise a serial number or similar identification indicia, a code which may contain 5 characters, and other information. Alternately, the activation information may be pre-associated with a PAN, and activation may associate the specific fee with the PAN.

At block 432, the Intermediary sends confirmation and PAN to the Kiosk (optionally with encryption and masking).

At block 434, the Intermediary maintains a record of all transactions for subsequent invoicing and reconciliation.

As shown in FIG. 4B, blocks 440-444 may occur at the Kiosk. At block 440, the Kiosk may send the PAN to the Provider to process payment of the specific fee.

At block 442, the customer may complete the order from the Provider (optionally with assistance from the Retailer Associate).

At block 444, the Kiosk may print a bar code associated with the specific fee, and optionally the bar code incorporates value.

Block 450 may occur at the POS. At block 450, the SKU and the amount are entered into the POS, and a cash transaction is tendered and recorded. Additional transaction or handling fees for the Retailer and/or the Intermediary may be required, in addition to the specific fee for the Provider.

Blocks 460 and 462 relate to the Retailer. At block 460, the Retailer maintains a record of all transactions for subsequent invoicing and reconciliation. At block 462, if the customer does not pay, then the prior transaction at the Kiosk is voided.

Blocks 470 and 472 relate to the Provider. At block 470, the Provider may identify the PAN (optionally as a VISA™ type card PAN, or as a Retailer Cash card PAN), and allows the order to proceed. At block 472, the Retailer maintains a record of all transactions for subsequent invoicing and reconciliation.

Blocks 480 and 482 are related to the Customer. At block 480, the Customer may leave the store with a receipt for the specific fee and an order confirmation. At block 482, the Customer may manage installation, service queries, and returns with the Provider.

The embodiments of the present invention are not to be limited in scope by the specific embodiments described herein. Indeed, various modifications of the embodiments of the present invention, in addition to those described herein, will be apparent to those of ordinary skill in the art from the foregoing description and accompanying drawings. For example, various blocks may be omitted or reordered. Thus, such modifications are intended to fall within the scope of the following appended claims.

Further, although the embodiments of the present invention have been described herein in the context of a particular implementation in a particular environment for a particular purpose, those of ordinary skill in the art will recognize that its usefulness is not limited thereto and that the embodiments of the present invention can be beneficially implemented in any number of environments for any number of purposes. Accordingly, the claims set forth below should be construed in view of the full breadth and spirit of the embodiments of the present invention as disclosed herein.

The invention claimed is:

1. A method for conducting a purchase transaction of goods or services from a provider, the purchase transaction facilitated by a computerized kiosk disposed at a retailer other than the provider, wherein value for the purchased goods or services is received at the computerized kiosk in the form of a temporary value card, the method comprising:
    receiving at an intermediate computer processor a request for a temporary value card from an electronic point of sale terminal at the retailer, the request comprising an indication of a specific value needed to purchase goods or services selected by a customer at the computerized kiosk;
    activating at the intermediate computer processor a temporary value card account number and card verification value;
    associating the indication of the specific value received from the point of sale terminal with the temporary value card account number;
    providing the temporary value card account number and card verification value from the intermediate computer processor to the retailer for recordation of the temporary value card account number and card verification value on to a tangible medium and distribution of the tangible medium to the customer;
    settling accounts between the intermediate computer processor and the retailer;
    receiving at the intermediate computer processor a redemption request from the provider, the redemption request comprising the temporary value card account number, wherein the provider receives the temporary value card account number via the computerized kiosk; and
    settling accounts between the intermediate computer processor and the provider.

2. The method of claim 1, wherein associating the indication of the specific value received from the point of sale terminal with the temporary value card account number comprises:
    accessing a database at the intermediate computer processor;
    locating the temporary value card account number; and
    associating the specific value with the temporary value card account number.

3. The method of claim 1, wherein the redemption request further comprises customer account information and additional information associated with the temporary value card account number.

4. The method of claim 1, wherein the request for the temporary value card received at the intermediate computer processor further comprises the temporary value card account number and the card verification value.

5. The method of claim 1, wherein the temporary value card is associated with a provider of goods and services.

6. The method of claim 1, further comprising:
sending a confirmation to the computerized kiosk that the settling of accounts between the intermediate computer processor and the provider has been completed.

7. The method of claim 1, wherein the temporary value card additionally comprises information sufficient to identify financial accounts associated with the customer.

8. The method of claim 1, wherein the computerized kiosk comprises a physical booth, a dedicated computer terminal, a designated bill pay device, a general purpose computer terminal, a computer system, or a virtual website on the internet.

9. The method of claim 1, wherein the temporary value card receives an associated expiration date at the time the temporary value card account number and card verification value are activated.

10. The method of claim 1, wherein activating the temporary value card account number and card verification value comprises:
accessing a database at the intermediate computer processor;
locating the temporary value card account number stored in the database; and flagging the temporary value card account number as activated.

11. The method of claim 1, further comprising:
associating an excess value with the temporary value card account number when the indication of the specific value is greater than the amount necessary to purchase the goods or services selected at the computerized kiosk.

12. The method of claim 11, receiving at the intermediate computer processor a request for a refund of the excess value associated with the temporary value card account number.

13. The method of claim 1, wherein the temporary value card account number is a personal account number (PAN).

14. A method for conducting a purchase transaction of goods or services from a provider, the purchase transaction facilitated by a computerized kiosk disposed at a retailer other than the provider, wherein value for the purchased goods or services is received at the computerized kiosk in the form of a temporary value card, the method comprising:
receiving at an intermediate computer processor a request for a temporary value card from a point of sale terminal at the retailer, the request comprising an indication of the specific value needed to purchase goods or services selected by a customer at the computerized kiosk, the request further comprising an identifier associated with a temporary value card account number;
identifying at the intermediate computer processor the identifier associated with the temporary value card account number;
activating at the intermediate computer processor the temporary value card account number and a card verification value;
associating the indication of the specific value received from the point of sale terminal with the temporary value card account number;
providing the temporary value card account number and card verification value to the retailer for recordation of the temporary value card account number and card verification value on to a tangible medium and distribution of the tangible medium to the customer; and
receiving at the intermediate computer processor a redemption request from the provider, the redemption request comprising the temporary value card account number, wherein the provider receives the temporary value card account number via the computerized kiosk.

15. The method of claim 14, further comprising:
settling accounts between the intermediate computer processor and the retailer;
settling accounts between the intermediate computer processor and the provider.

16. The method of claim 14, wherein the step of activating the temporary value card account number and a card verification value comprises:
accessing a database at the intermediate computer processor;
locating the temporary value card account number by using the identifier associated with the temporary value card account number; and
flagging the temporary value card account number as activated.

17. A system for conducting a purchase transaction of goods or services from a provider, the purchase transaction facilitated by a computerized kiosk disposed at a retailer other than the provider, wherein value for the purchased goods or services is received at the computerized kiosk in the form of a temporary value card, the system comprising:
a temporary value card;
a point of sale terminal at the retailer configured to:
read or otherwise obtain from the temporary value card the information thereon;
receive a specific value from a customer; and
an intermediate computer processor configured to:
receive a request for the temporary value card from the retailer, the request comprising an indication of the specific value needed to purchase goods or services selected by the customer at the computerized kiosk;
activate a temporary value card account number and card verification value;
associate the indication of the specific value received from the retailer with the temporary value card account number;
provide the temporary value card account number and card verification value to the retailer for recordation of the temporary value card account number and card verification value on to a tangible medium and for distribution of the tangible medium to the customer; and
receive at the intermediate computer processor a redemption request from the provider, the redemption request comprising the temporary value card account number, wherein the provider receives the temporary value card account number via the computerized kiosk.

* * * * *